Nov. 10, 1931.  J. CHRISTIE  1,830,870
OIL JACKETED INSULATOR FOR ELECTRIC SWITCHGEAR AND THE LIKE
Filed Jan. 28, 1930
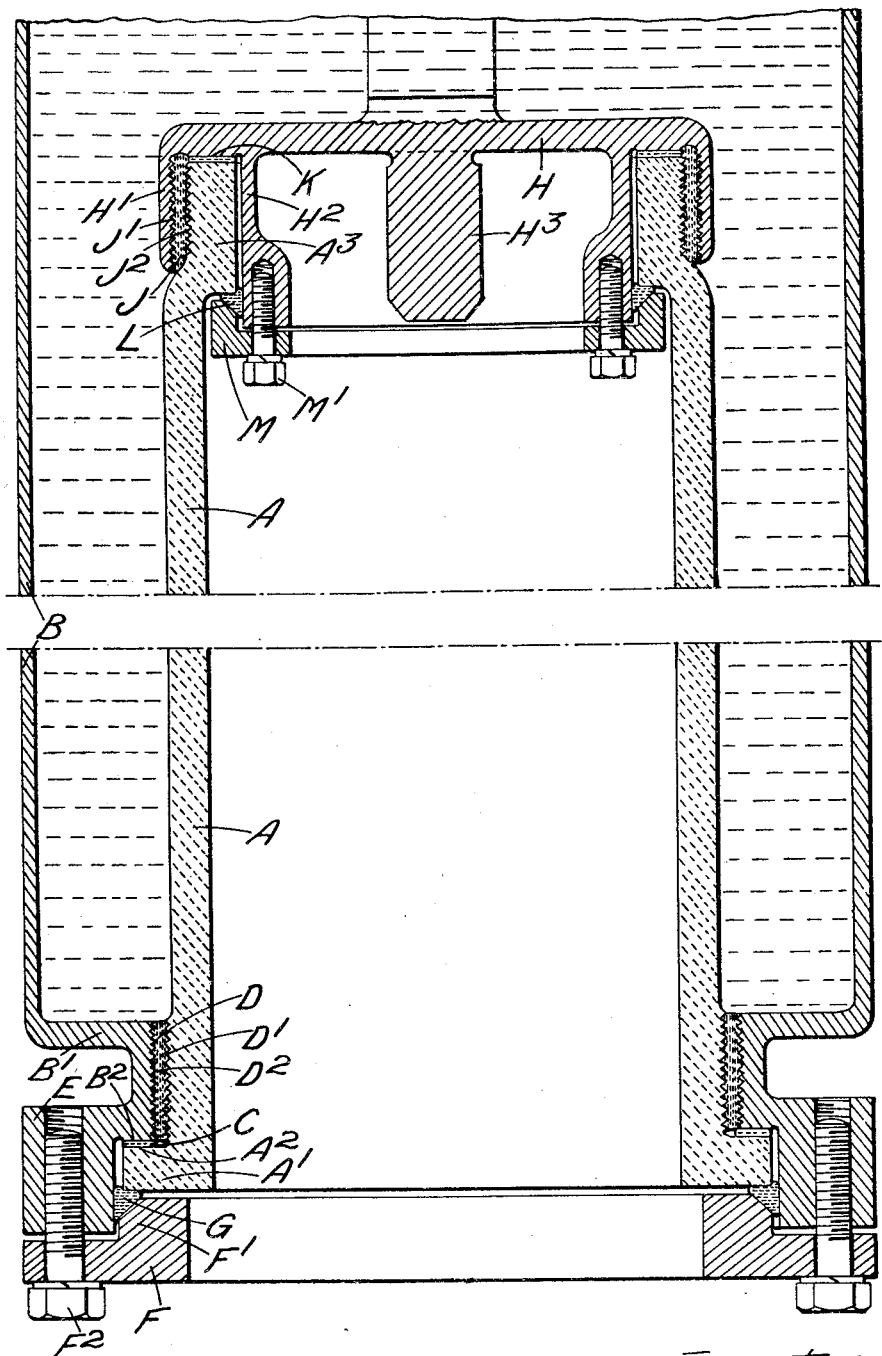
Inventor
John Christie
Per
Watson, Cat, Morse & Grindle
Atty.

Patented Nov. 10, 1931

1,830,870

UNITED STATES PATENT OFFICE

JOHN CHRISTIE, OF SUNDERLAND, ENGLAND, ASSIGNOR TO A. REYROLLE & COMPANY LIMITED, OF HEBBURN-ON-TYNE, ENGLAND, A COMPANY OF GREAT BRITAIN

OIL-JACKETED INSULATOR FOR ELECTRIC SWITCHGEAR AND THE LIKE

Application filed January 28, 1930, Serial No. 424,128, and in Great Britain February 20, 1929.

This invention relates to oil-jacketed insulators for electric switchgear and the like.

In electric switchgear and like apparatus hollow or orifice insulators are sometimes mounted in a metal casing and the space between the insulator and the casing filled with oil so that the insulator is oil-jacketed. It is essential that there should be an oil-tight joint between such insulators and their casings, and the object of the present invention is the construction of an oil-jacketed insulator wherein such joints can be efficiently made.

An oil-jacketed insulator according to this invention has two washered or gasketed joints in series, one of such joints being cemented or otherwise permanently sealed whilst its washer is under compression and the washer for the other joint being normally under compression but renewable without breaking the first joint.

One convenient construction will now be described by way of example with reference to the single figure of the accompanying drawing which shows in sectional elevation the joints at each end of an oil-jacketed orifice insulator.

The insulator A is surrounded by a metal casing B and is formed at its open end or mouth with an external flange $A^1$ the inner face $A^2$ of which makes a joint with the face $B^2$ of an internal flange $B^1$ forming part of the adjacent end of the metal casing B, a washer or gasket C being arranged between the cooperating faces $A^2$ and $B^2$. A small space or clearance D is left between the surface of the body of the insulator adjacent the flange $A^1$ and the adjoining surface of the casing B, these surfaces being roughened as indicated at $D^1$ and $D^2$ so that cement which is filled into the space in a manner to be hereinafter described, shall be keyed therein.

The flange $B^1$ is prolonged to form an outer rim E which constitutes the mouth of the casing and extends beyond the external flange $A^1$ of the insulator A. A clamping flange or pressure ring F having an internal flange $F^1$ which fits inside the rim E is clamped to the rim by means of studs $F^2$. The flange $F^1$ exerts pressure on a washer or gasket G interposed between it and the adjacent surfaces of the flange $A^1$ of the insulator and the rim E of the casing. The washer G when clamped in position thus constitutes the second oil-tight joint.

The double or "series" joint is made by placing all the parts in position and tightening the studs $F^2$. Then whilst the washers C and G are under compression cement is run into the space D and allowed to set. There is then a very effective oil-tight joint between the insulator A and the casing B the oil being prevented from leaking out by the cement, the first or inner washer C and the outer washer G. As the cement fixes the parts in position with the washer C compressed, the ring F may be temporarily removed to allow the renewal of the outer washer G when necessary without otherwise disturbing the joint or running out the oil between the casing and the insulator.

The inner end of the insulator A is similarly provided with a double joint to prevent the passage of oil from the casing B to the interior of the insulator. For this purpose an internal flange $A^3$ is formed at the inner end of the insulator which cooperates with a metal cap H having a rim $H^1$ and an internal annular flange $H^2$ concentric with the rim. The annular space between the rim $H^1$ and the flange $H^2$ accommodates the flange $A^3$ of the insulator, a washer or gasket K being interposed between the end of the flange $A^3$ and the metal cap H. The internal diameter of the rim is larger than the external diameter of the flange $A^3$ so that a space J is left to be filled with cement, the internal surface of the rim $H^1$ and the external surface of the flange $A^3$ being suitably roughened as indicated at $J^1$ and $J^2$ so as to cooperate with the cement.

The annular flange $H^2$ of the metal cap is prolonged so that it extends below the flange $A^3$ of the insulator and the second joint is made by means of a washer L which is held by a clamping or pressure ring M so that it makes an oil-tight joint between the bottom of the flange $A^3$ of the insulator and the extended portion of the rim $H^2$, the pressure ring M being clamped to the flange H² by means of studs M¹.

This joint is assembled, as in the arrangement previously described for the joint at the mouth of the insulator, by placing all the parts in position and tightening the studs M¹. The cement is then run in and allowed to set so that it holds the washer K in compression and permits, when necessary, the ring M being removed to renew the washer L. The cap H may carry some part of the gear of which the insulator forms a portion, for instance, as shown in the figure, in switchgear it may support a central contact H³ for cooperating with another contact (not shown) on an insulating bushing which projects into the insulator A.

It will be appreciated that the above description is by way of example only and that modifications may be made in the detailed construction within the scope of the invention. Further, although a vertical oil-jacketed insulator is shown in the drawing, the invention is equally applicable to horizontally arranged insulators for use, for example, as orifice insulators in switchgear of the horizontal draw-out type.

What I claim as my invention and desire to secure by Letters Patent is:—

1. In an oil-tight joint between an insulator having a flange and a metal casing having a cooperating flange, the combination of an inner washer between adjacent faces of the flanges, an outer washer between the other face of the insulator flange and the casing, a clamping ring for holding the two washers in compression, and a cemented joint between the insulator and the casing, the cemented joint being formed when the washers are held in compression by the ring so that it retains the inner washer in compression but permits the clamping ring to be removed and the outer washer to be renewed without breaking the joint.

2. An oil-jacketed insulator including in combination a hollow insulator, a flange on the insulator, a metal casing surrounding the insulator, a flange on the casing for cooperating with the insulator flange, an inner washer between the flanges, an outer washer between the insulator flange and the casing, a clamping ring engaging the outer washer and holding both washers in compression, and a cemented joint between the casing flange and the insulator, said cemented joint being formed when the washers are held in compression by the ring so that it retains the inner washer in compression but permits the clamping ring to be removed and the outer washer to be renewed without breaking the joint.

3. An oil-jacketed insulator including in combination a tubular insulator, an outer flange at one end of the insulator, an inner flange at the other end of the insulator, a metal casing surrounding the insulator, a flange on the casing for cooperating with the outer insulator flange, an inner washer between the outer insulator flange and the casing flange, an outer washer between the insulator flange and the casing, a lower clamping ring engaging the outer washer and holding both washers in compression, a cemented joint between the casing flange and the insulator, a cap for the end of the insulator having the inner flange, a rim on the cap, an annular flange on the cap inside the rim, an end washer between the end of the insulator and the cap, an outer washer between the annular flange on the cap and the inner flange on the insulator, an upper clamping ring engaging the outer washer and holding both washers in compression, and a cemented joint between the insulator and the rim of the cap, the cemented joints between the casing and the insulator and between the rim and the insulator being formed when the appropriate washers are in compression so that the clamping rings can be removed as desired to permit the outer washers to be renewed without breaking the joints.

4. An oil-jacketed orifice insulator for draw-out type switchgear including in combination a tubular insulator, an outer flange at one end of the insulator, an inner flange at the other end of the insulator, a metal casing surrounding the insulator, a flange on the casing for cooperating with the outer insulator flange, an inner washer between the outer insulator flange and the casing flange, an outer washer between the insulator flange and the casing, a lower clamping ring engaging the outer washer and holding both washers in compression, a cemented joint between the casing flange and the insulator, a cap for the end of the insulator having the inner flange, a central contact on the cap, a rim on the cap, an annular flange on the cap inside the rim, an end washer between the end of the insulator and the cap, an outer washer between the annular flange on the cap and the inner flange on the insulator, an upper clamping ring engaging the outer washer and holding both washers in compression, and a cemented joint between the insulator and the rim of the cap, the cemented joints between the casing and the insulator and between the rim and the insulator being formed when the appropriate washers are in compression so that the clamping rings can be removed as desired to permit the outer washers to be renewed without breaking the joints.

5. An oil-jacketed insulator including in combination an insulator, a casing surrounding the insulator, an oil-tight connection between the casing and the insulator, such connection comprising a washered joint and a cemented joint between said casing and said insulator, said cemented joint serving to retain said washered joint permanently in position, and means removably associated with said casing and insulator and comprising a second washered joint therebetween, said cemented joint and said washered joints being arranged in series.

6. An oil-jacketed insulator including in combination an insulator, a casing surrounding the insulator, cooperating flanges on the insulator and the casing, an oil-tight joint between the casing and the insulator formed between the flanges, and a clamping ring for the joint, such joint comprising a cemented joint and two washer joints in series, one washer joint being permanently retained in position by the cemented joint, while the other washer joint can be renewed by removing the clamping ring without breaking the cement joint.

7. In apparatus of the class described, the combination with an oil jacketed insulator, of means for effecting fluid-tight sealing of said insulator, said means comprising an element having a portion thereof surrounding said insulator, a cemented joint between said insulator and the surrounding portion of said element preventing relative movement of said insulator and element, a washered joint between said insulator and element retained permanently in position by said cemented joint, and means removably associated with said element and insulator and comprising a second washered joint therebetween, said cemented joint and said washered joints being arranged in series.

In testimony whereof I have signed my name to this specification.

JOHN CHRISTIE.